United States Patent [19]

Suarez-Infanzon et al.

[11] Patent Number: 4,645,578
[45] Date of Patent: Feb. 24, 1987

[54] PROCEDURE FOR COPPER CHLORIDE AQUEOUS ELECTROLYSIS

[76] Inventors: Luis A. Suarez-Infanzon, Sextante 88, 28023 Madrid; Eduardo D. Nogueira, Avda. del Mediterraneo 47, 28007 Madrid, both of Spain

[21] Appl. No.: 864,558

[22] Filed: May 15, 1986

Related U.S. Application Data

[63] Continuation of Ser. No. 713,454, Mar. 19, 1985, abandoned.

[30] Foreign Application Priority Data

Mar. 27, 1984 [ES] Spain .................................. 531.038

[51] Int. Cl.$^4$ ............................................ C25C 1/12
[52] U.S. Cl. ..................................... 204/107; 204/128
[58] Field of Search ........................ 204/107, 128, 98

[56] References Cited

U.S. PATENT DOCUMENTS

| | | | |
|---|---|---|---|
| 3,778,360 | 12/1973 | Gordy | 204/107 |
| 3,984,295 | 10/1976 | Kametani et al. | 204/107 |
| 4,268,363 | 5/1981 | Coughlin | 204/107 |
| 4,272,492 | 6/1981 | Jensen | 204/107 |
| 4,308,239 | 12/1981 | Parker et al. | 204/107 |
| 4,490,224 | 12/1984 | Warheit | 204/107 |

FOREIGN PATENT DOCUMENTS 27342 of 1912 United Kingdom ................ 204/107

Primary Examiner—R. L. Andrews

[57] ABSTRACT

The process for extraction of copper metal from copper sulfide ore comprises leaching copper sulfide ore with ferrous chloride solution, to produce copper chloride, and electrolysis of the copper chloride using adjacent electrolytic cells separated by a semi-permeable membrane. The leach liquor containing copper chloride is introduced into the cathode cell containing an aqueous electrolyte, and brine is introduced into the anode cell. The semi-permeable membrane is permeable by monovalent cations, permitting the flow of sodium ions or other monovalent cations from the anode to the cathode during electrolysis. Copper metal is withdrawn from the cathode and chlorine gas is removed from the anode for reclamation. The depleted copper chloride may be recycled for further electrolysis treatment. The depleted leach liquor may also then be treated with zinc powder and removed for further processing to remove lead, precious metals and other elements. Zinc cations and ferrous chloride may be also recovered from solution for recyling.

7 Claims, 2 Drawing Figures

PROCEDURE FOR COPPER CHLORIDE AQUEOUS ELECTROLYSIS

This is a continuation of co-pending application Ser. No. 713,454 filed Mar. 19, 1985 now abandoned.

BACKGROUND OF THE INVENTION

The conventional method for extracting copper from its more common natural form, the sulphide ore, involves roasting of such sulphides, producing sulfur dioxide, a gas, and the metal oxide.

This oxide is later reduced with any adequate reagent, mainly carbon, to a solid metallic form, that finally is refined electrochemically to the degree of purity required in the diverse destiny of the metal.

This conventional procedure, centuries old in its main features, has serious disadvantages today due to four main reasons: (a) Air quality laws, limiting drastically the $SO_2$ emission to the atmosphere, (b) increasing energy cost, (c) decreasing quality of copper deposits, and (d) the requirement of building high capacity plants to meet competitive costs.

These problems have promoted new interest in the old idea of processing the sulphides through a chloride route, instead of the oxide route.

This idea avoids air pollution, because its main leaching reaction,

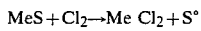

$$MeS + Cl_2 \rightarrow Me\ Cl_2 + S°$$

leaves the sulfur content of the sulphides in elemental form, easily disposable or marketable as a solid.

This idea requires electrolysis of the produced metal chlorides, and reclaiming the chlorine. Otherwise, the chlorine cost will adversely affect the economics of the process.

The electrolysis of copper chloride has three main requirements: (1) separate chambers for extraction of anodic and cathodic products, in order to avoid toxic effects of chlorine in the working area; (2) maximum current density and compactness on the cell, to minimize the investment costs; and (3) a high purity catholyte, to prevent deposition of impurities along with the copper.

Conventional copper sulphate electrolysis is carried out at 200 A m$^{-2}$ to prevent voltage build up and deposition of impurities. When current density rises above that value, the resulting copper cathode fails in meeting quality standards.

Copper chloride electrolysis has been attempted, to various degrees of success, by several groups. The CYMET process (1), the work by the Bureau of Mines (2), Elken (3) and Clear-Duval (4) are the better known ones. They carry out the electrolysis in a molten salt electrolyte, or an aqueous solution of the salt, using a diaphragm to separate the anolyte and catholyte.

(1) U.S. Pat. No. 3,673,061
(2) Complex Sulphide ores Symposium. Rome October 1980 p. 135-140
(3) Ibid. p. 135-140
(4) U.S. Pat. No. 3,879,272

The process using molten salt electrolysis requires purification of the salt feed. It is accomplished via crystallization. On the whole, the energy consumption, and the cumbersome handling of high temperature solid and molten streams, have discouraged any potential users.

Diaphragm cells for electrolysis of dissolved salts suffer from low current efficiency and poor copper quality, due to the presence of impurities in the electrolyte.

DETAILED DESCRIPTION OF THE INVENTION

Figure 1:
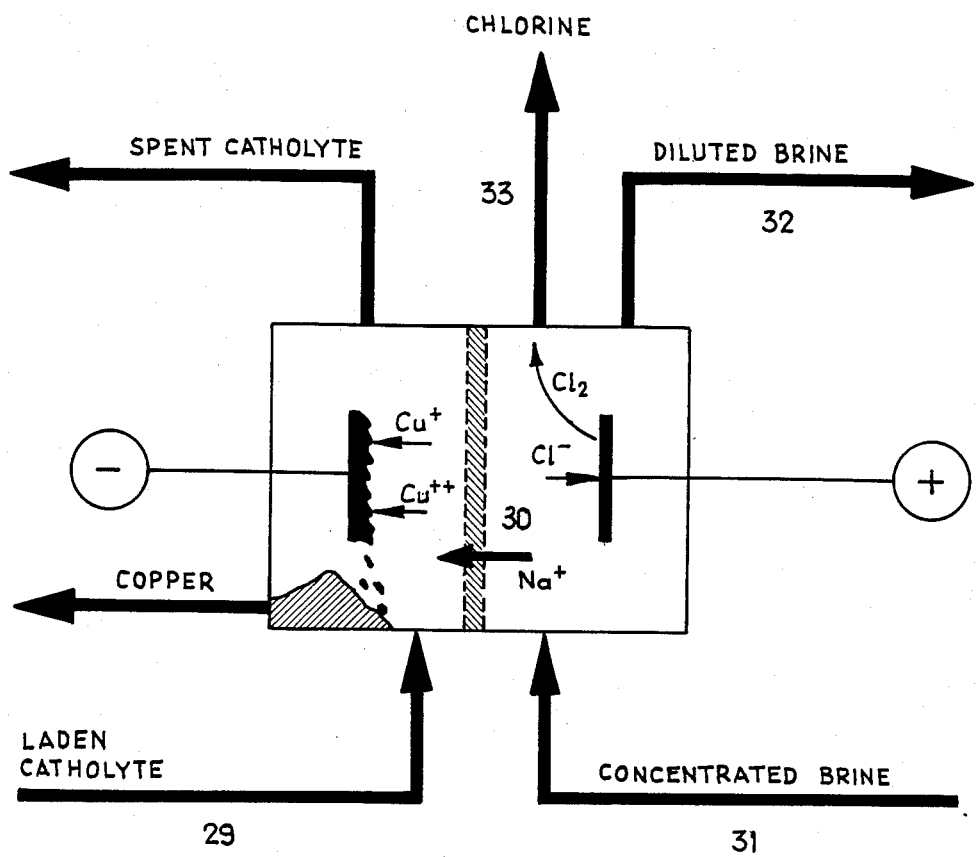
FIG. 1 is a schematic representation of the electrolytic cell of the invention.

The present invention solves these problems by using a special cell design. Using a cationic permoselective or semi-permeable membrane permits the chemical separation of the anolyte and catholyte. The membrane is permeable only to monovalent cations. The passage of any other type of cation is severly restricted, if not blocked, for mechanistic and steric reasons. The electric circuit is completed by the passage of the most common monovalent cation, sodium, through the membrane. FIG. 1 shows the scheme of such cell. The catholyte, stream no. 29, a solution of copper chlorides is fed to the cathodic space. Copper ions, having either a cupric or cuprous valence, migrate toward and are reduced at the cathode, in a form depending upon the current density used. Copper powder is formed at cathodic current densities greater than 1 KA m$^{-2}$. This powder falls from the cathode to the bottom of the cell, where it is extracted.

Chemical equilibrium in the catholyte is restored by the sodium ions, stream no. 30, coming from the anolyte through the membrane. They transport the electricity and close the circuit through the isolating membrane.

A brine, stream no. 31, partially or totally saturated, is fed as anolyte to the anode section of the cell. Chloride ions move to the anode surface and are oxidized there, forming chlorine molecules. Chlorine evolves from the anode, and it is extracted from the cell, stream no. 33. The membrane prevents the passage of chlorine to the cathodic space.

A depleted brine, with a concentration to be chosen according to the economics of the operation, leaves the cell as spent anolyte, stream no. 32.

The sodium ions in excess, after the chloride ion discharge, move through the membrane toward the catholyte, as said before, restoring the ionic equilibrium.

This cell can be operated with electrolytes of different composition in both electrodes. Electrolyte composition can thus be tailored to meet the specific electrodic requirements, without any dependence upon the other electrode. Thus the catholyte can be a concentrated solution of copper chlorides, with the minimal chloride ion concentration required to keep the cuprous ions formed during the electrolysis in solution. The anolyte, on the contrary, can be a concentrated salt solution, without any significant presence of other cations, these being the best conditions to facilitate chlorine discharge.

When acidity becomes important in the anolyte, a significant amount of protons may be substituted for the sodium ions in the job of transporting the electricity through the membrane. Its mobility being greater than that of sodium ions, such a substitution involves a cell voltage decrease. From that point of view, the use of an acidic solution instead of brine would appear to be a convenient procedure, but there are severe disadvantages to it. The first one to be considered will be the higher cost of hydrogen ions, or acidity, as compared with sodium ions. The second disadvantage is that acidity build up in the catholyte is very expensive, when the catholyte is to be recycled and some cation cementation has to take place later.

An additional advantage of this invention lies in the practically total separation of chlorine gas from the catholyte, thus avoiding any back-migration of this element, that could reoxidize cuprous ions to cupric ions, with loss in the current efficiency.

A further advantage is that the anode is positioned in close contact with the membrane, due to the slight vacuum at which the anolyte is operated. In this way, the ohmic drop in the anolyte practically disappears and the cell voltage is reduced.

Another advantage is the possibility of using poor quality salt, at a low price, for the anolyte brine, without introducing impurities into the catholyte, due to the blockage that the membrane establishes.

These advantages mentioned above are particularly important for a process where high quality copper is directly extracted by electrolysis without the need for further refining.

This process may also utilize a selective agent for extracting the copper away from any solution containing impurities. The cupric chloride solution, purified in such a way, would constitute the feed to the cell described in this invention.

The same procedure for purifying the copper solution can be used to reclaim the copper content in the depleted catholyte upgrading it to higher concentration, suitable to feed the cell.

Figure 2:
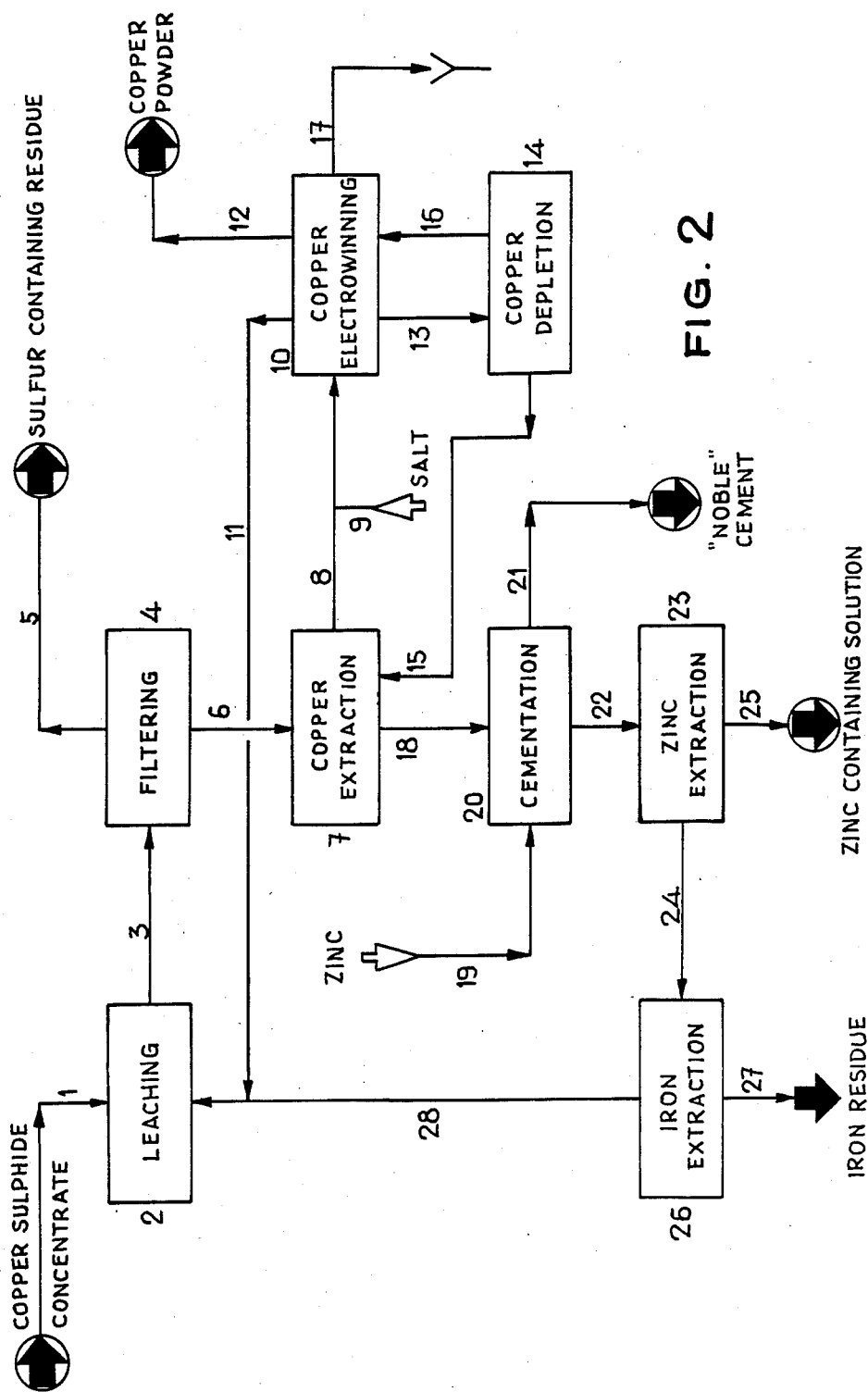
FIG. 2 is a schematic diagram of the process of the invention.

The simplified scheme of this process is shown in FIG. 2.

Copper sulphide containing ore, or concentrate, 1, is fed to a leaching section, 2, where it reacts with a solution of ferrous chloride, 28, and chlorine, 11. The emerging stream, 3, is filtered, 4, leaving a solid residue, 5, containing the elemental sulfur produced by the oxidation of the sulphide, and a liquid stream, 6, containing the chlorides of the metals present in the ore. The copper will be the main leached metal, but many others, such as lead, zinc, precious metals, antimony, arsenic, and molybdenum will be present besides the obvious iron content.

This liquid stream, 6, is treated in a copper selective extraction unit, 7, forming a concentrated cupric chloride solution, 8, with less of 0.01% of any other metal besides copper, which constitutes the catholyte.

This catholyte, 8, is treated by the addition of salt, 9, prior to entering the cell, 10, where the copper chloride is electrolyzed, forming chlorine gas, 11, and metallic copper powder, 12.

The spent catholyte, 13, where the copper chloride content has been depleted to approx. 10% of its initial value, is treated in a new extraction unit, 14.

The copper is recycled back, 15, to the main copper extraction unit, and the residue, 16, is a practically pure brine, that is fed back to the cell as anolyte.

The depleted anolyte, 17, is discharged as a weak brine.

Leach liquor, once the copper has been extracted, 18, is treated with zinc powder, 19, in a cementation unit, 20, where every cation more electropositive than zinc is reduced to the metallic state.

The resulting cement, 21, a solid, is reclaimed from the process circuit.

This cement contains practically all the lead, precious metals, and impurities entering with the ore. It should be processed elsewhere to extract its valuable components.

The liquid stream, 22, emerging from the cementation contains the iron in reduced, ferrous, form and the zinc cation substituting for the cemented cations. This zinc is selectively extracted in another unit, 23, using well known, proven agents, such as organic derivatives of phosphoric acid. The zinc concentrated solution, 25, is processed elsewhere to recover the metal.

The residual ferrous chloride stream, 24, enters into a unit, 26, where the excess iron, the amount leached out from the ore, is extracted from the circuit via alkaline precipitation, leaving the leaching circuit as iron hydroxide, 27.

The rest of the ferrous chloride solution, 28, is fed back to the leaching reactor, together with the chlorine, 11, to continue the operation.

Example No. 1

A solution containing 70 g/L of Cu (II), 0 g/L of Cu (I), 130.8 g/L of NaCl and 0 g/L of HCl is fed to the cathodic section of a cell. The electrode sections of the cell are separated by a Nafion membrane no. 117, with an equivalent weight of 1100 and a thickness of 0.15 mm. The electrode surfaces were 60 cm$^2$ in both cases. The temperature is maintained at 50° C.

A solution containing 225.1 g/L of sodium chloride is fed to the anodic section of the cell.

9 A of direct current was applied to the cell during 381 min., with a resulting current density of 1.5 KA/m$^2$.

Copper deposit in the cathode was intially plate, and the cell voltage initially was 2.83 V. This voltage drops, after 5-10 min of operation, reaching a constant voltage of 1.8-1.9 V.

This decrease in voltage is attributed to the increase in the copper cathodic surface, due to the formation of copper powder deposit.

Total recovered copper was 56.77 g as dry powder, with a current efficiency of 83.7%.

Spent catholyte concentration was 4.36 g/L of Cu (II), 5.14 g/L of Cu (I), 247.0 g/L of NaCl; current efficiency increases to 86.6%, if Cu (I) formation is taken into account.

Example No. 2

A new experiment, carried out with the same cell described in the previous example, was run at a 1 1 KA/m$^2$ of current density.

|  | Composition, g/L | | | |
|---|---|---|---|---|
|  | Catholyte | | Anolyte | |
|  | Feed | Spent | Feed | Spent |
| Cu (II) | 70 | 5.65 | 0 | 0.09 |
| Cu (I) | 0 | 7.67 | 0 | 0 |
| NaCl | 146.5 | 266.3 | 225 | 190.25 |
| HCl | 10.6 | 8.5 | 0 | 0.43 |

Voltage of the cell during the operation was 1.59 V, with 2.2 V as the initial value.

Current efficiency for copper deposition was 95.5% and 96.6%, when Cu (I) is taken into account.

Example No. 3

A similar experiment was run at 2 KA/m$^2$ of current density

| Composition, g/L | | | | |
|---|---|---|---|---|
| | Catholyte | | Anolyte | |
| | Feed | Spent | Feed | Spent |
| Cu (II) | 71.9 | 6.42 | 0 | 0.03 |
| Cu (I) | 0 | 4.36 | 0 | 0 |
| NaCl | 143.5 | 260.1 | 225.1 | 205.5 |
| HCl | 10 | 6.3 | 0 | 0.39 |

Initially cell voltage was 3.2 V, with 2.21 V as the value for routine operation.

Copper recovery current efficiency was 89.3%, or 94.6% taking into account the Cu (I) formation.

We claim:

1. A process for electrolysis of aqueous copper chloride which comprises providing an electrolytic cell with a cationic permeable membrane selective to permit the flow of monovalent alkali metal cations but restrict the flow of other cations separating the cell into cathode and anode compartments; providing electrodes for the cell comprising a cathode for the cathode compartment and an anode for the anode compartment; providing and maintaining chloride solutions within the anode and cathode compartments; feeding an aqueous solution of copper chloride into the cathode compartment, while removing spent catholyte from the cathode compartment; feeding an aqueous solution of an alkali metal chloride into the anode compartment, while removing spent anolyte from the anode compartment; and applying and maintaining direct electric current and voltage to the electrodes in order to promote the reduction of cupric ions on the cathode, the oxidation of chloride ions on the anode, and the transferring of alkali metal cations through the cationic permeable membrane separating the cathode and anode compartments, thereby producing metallic copper at the cathode and chlorine gas at the anode.

2. A process as defined in claim 1 wherein the alkali metal chloride solution used as anolyte feed into the anode compartment is a sodium chloride solution with a chloride concentration above 0.5 molar.

3. A process as defined in claim 1 wherein the alkali metal chloride solution feeding the anode compartment is the spent catholyte removed from the cathode compartment after the spent catholyte is depleted of copper sufficiently to produce a final copper concentration below 0.5 grams per liter.

4. A process as defined in claim 1 wherein the cationic permeable membrane is selective to permit the flow of monovalent alkali metal cations, and is resistant to chemical attack by chlorine gas, to permit the flow of alkali metal cations from the anode to the cathode compartment through the membrane, providing the mechanism responsible for the electric current flow between electrodes.

5. A process as defined in claim 1 wherein the aqueous solution of copper chloride used as catholyte feed contains copper as either cupric or cuprous cations at a total concentration above 2 grams per liter, and also an alkali metal chloride, so as to provide a total chloride ion concentration no lower than 3 molar.

6. A process as defined in claim 1 wherein the copper cations which are reduced to metallic copper on the cathode are simultaneously replaced in the catholyte by the equivalent amount of alkali metal cations from the anolyte through the cation permeable membrane.

7. A process as defined in claim 1 wherein the electrolytic cell is operated at electric current densities ranging from 200 to 4000 Amps per square meter for the cathode, and from 100 to 10,000 Amps per square meter for the anode.

* * * * *